I. STRAUB.
Vegetable Cutter.
No. 11,390.
Patented July 25, 1854.
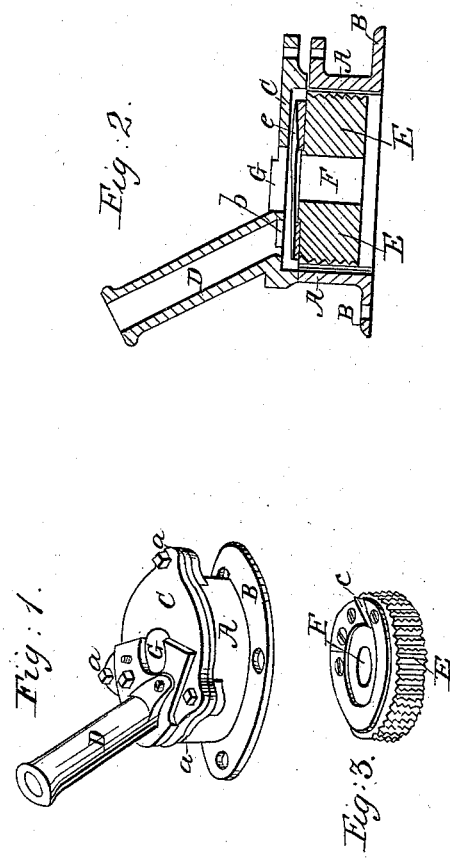

UNITED STATES PATENT OFFICE.

ISAAC STRAUB, OF CINCINNATI, OHIO.

CORNCOB-CUTTER.

Specification of Letters Patent No. 11,390, dated July 25, 1854.

*To all whom it may concern:*

Be it known that I, ISAAC STRAUB, of Cincinnati, in the county of Hamilton and State of Ohio, have invented certain new and useful Improvements in Corncob-Cutters; and I do hereby declare the following to be a full, clear, and exact description of the same, reference being had to the accompanying drawings, making a part thereof, in which—

Figure 1, represents a perspective view of the outer shell, and the cutting bur which runs within it, detached. Fig. 2, represents a vertical section taken through the two when in place.

Similar letters in both drawings refer to like parts.

The nature of my invention relates to the combination of a rotating bur provided with a blade or cutting edge on top and with toothed or other roughened surface on its perimeter and a stationary shell, also provided with a knife or cutting edge, said cutting edges operating together shear fashion for slicing off the corn and cob as fed into it, and reducing it preparatory to its being introduced between secondary grinding surfaces, as will be described.

To enable others skilled in the art to make and use my invention, I will proceed to describe the same in connection with the drawings.

A, is a cylinder, having a flange B, on its bottom by which it may be attached to, or connected with, the upper mill stone of any ordinary mill, in such position that the feet may be direct through and into the eye of said stone.

C, is a cap which covers the top of the shell or cylinder A, and should be so connected to the cylinder by set screws, *a, a, a,* as to be easily removed, for the purpose of adjusting the shear blade, *b*, Fig. 2 which is placed on the underside of said cap.

D, is a tube through which the cobs of corn, or ears, are fed through to be reduced preparatory to their passing to the grinding surfaces.

Within the shell A, is a bur, E, having a shear blade, *c*, on its top surface, which runs against the edge of the blade *b*, shear fashion, for slicing off the ears of corn as they gradually settle down through the tube D, and thus reduce them to a size suitable for passing between the grinding surfaces of the stones which may be place underneath them. The periphery of the bur E, may be formed into teeth, or vertical and horizontal grooves, or other roughened surface, between which roughened surface, and the inner perimeter of the cylindrical part of the shell A, the sliced material passes, to be further reduced preparatory to the grinding. There is an opening F, through the center of the bur E, which may be of an elliptic or oval form, for the purpose of fitting over a spindle of similar form, so as to turn with said spindle; and this spindle may be the same, or a prolongation of the same spindle which carries the runner. Any other form, or method of securing the bur on the spindle so as to turn with it, will answer an equal purpose. There is also an opening, G, through the cap of the shell or cylinder, to allow the spindle to pass up to a bridge tree or top support of any kind for giving the spindle a proper bearing.

The blade, *b*, is placed with its cutting edge in close proximity to the tube, so that the ear of corn may be in contact with it or nearly so, while the rotating blade has a firmer base to cut against, while it is thus supported. As soon as one slice is cut off, the ear drops, and the feed is always the exact amount that is sliced off at each rotation of the bur and this may of course be adjustable, so as to make it more or less as may be required. And if found essential, an inclined sweep may be placed on the underside of the bur, for drawing the material toward or into the eye of the stone below it.

Having thus fully described the nature of my invention what I claim therein as new, and desire to secure by Letters Patent, is—

The combination, of a rotating bur E, provided with a blade or cutting edge on top, and with a toothed or roughened surface on its perimeter, and a stationary shell also provided with a cutting edge, said cutting edges operating together shear fashion, for slicing off, and reducing ears of corn preparatory to their undergoing a further reducing or grinding operation, the whole being combined in the manner, and for the purpose substantially as set forth.

ISAAC STRAUB.

Witnesses:
A. B. STOUGHTON,
THOMAS H. UPPERMAN.